United States Patent Office

3,804,846
Patented Apr. 16, 1974

3,804,846
PROCESS FOR PURIFYING 2-MERCAPTO-BENZOTHIAZOLE
Ryohei Okamoto, Tokyo, Japan
No Drawing. Filed Aug. 6, 1971, Ser. No. 169,867
Claims priority application Japan, Aug. 14, 1970,
45/70,706
Int. Cl. C07d 91/48
U.S. Cl. 260—306                                10 Claims

ABSTRACT OF THE DISCLOSURE 2-mercaptobenzothiazole is purified by reacting an aqueous alkaline solution of crude 2-mercaptobenzothiazole with an oxidizing agent while passing air through the aqueous alkaline solution at a temperature of 30° C. or higher and coagulating the resulting oxidation products on carbon powders thereby to remove the oxidation products.

---

This invention relates to a process for purifying 2-mercaptobenzothiazole, and more particularly to a process for purifying 2-mercaptobenzothiazole by oxidizing impurities contained in the crude 2-mercaptobenzothiazole in an aqueous alkaline solution and removing the resulting oxidation products.

A process for purifying 2-mercaptobenzothiazole by oxidizing impurities contained in crude 2-mercaptobenzothiazole in an aqueous alkaline solution and removing the resulting oxidation products is disclosed in U.S. Pat. No. 2,730,528 to Robert G. Weyker et al. However, the solution resulting from the oxidation treatment of the aqueous alkaline solution of 2-mercaptobenzothiazole is generally difficult to filter owing to the presence of the formed tarry oxidation products, and it is difficult to carry out the purification in an industrial scale. Furthermore, 2-mercaptobenzothiazole having a high purity (99% or more) has a melting point of 177° C. or higher, but it is necessary to use a relatively large amount of an oxidizing agent to obtain the 2-mercaptobenzothiazole having such a high purity. As a result, over-oxidation reactions take place and benzathiazyl disulfide is formed. Consequently, the yield of 2-mercaptobenzothiazole is correspondingly reduced.

An object of the present invention is to provide a process for purifying 2-mercaptobenzothiazole with a high purity in high yield, where the solution resulting from the oxidation treatment is easy to filter. The object of the present invention can be attained by carrying out the oxidation reaction of the aqueous alkaline solution of crude 2-mercaptobenzothiazole using an oxidizing agent under aeration in the presence of carbon powders. That is to say, the present invention relates to a process for purifying 2-mercaptobenzothiazole, and the present process for the purification comprises dissolving crude 2-mercaptobenzothiazole in an aqueous alkaline solution, reacting the resulting solution with an oxidizing agent under aeration and heated condition, coagulating the resulting oxidation products on carbon powders suspended in the solution and separating the carbon powders from the solution thereby to remove the oxidation products therefrom.

As the aqueous alkaline solution to be used for dissolving the crude 2-mercaptobenzothiazole, an aqueous solution of an alkali metal hydroxide, such as sodium hydroxide and potassium hyydroxide, an alkaline earth metal hydroxide such as calcium hydroxide or ammonium hydroxide can be used. As the oxidizing agent, hydrogen peroxide, a chlorate such as sodium chlorate or potassium chlorate, a hypochlorite such as sodium hypochlorite or potassium hypochlorite, and a perchlorate such as ammonium perchlorate can be used in the form of an aqueous solution. Furthermore, chlorine can be used as the oxidizing agent. In that case, it is preferable to dilute the chlorine gas to about 200 to 400 times with air and use the diluted chlorine gas.

However, when the oxidation reaction is carried out only with said oxidizing agent, the tarry oxidation products, which will separate with the progress of the oxidation reaction, will be suspended in the solution, and therefore the solution will not be clarified. Filtration of such a solution is generally difficult, and particularly the tarry products become sticky when the liquid temperature is 60° C. or higher, and the filtration becomes more difficult. When the solution is aerated with air or gas containing oxygen at the oxidation reaction, the solution turns to a translucent one and a little improved effect can be obained. However, the difficulty of the filtration remains unchanged.

To overcome the difficulty of filtration of the solution resulting from the oxidation reaction using only the oxidizing agent, the present inventor has made studies on addition of carbon powders such as active carbon to the solution resulting from the oxidation reaction, and has recognized that the filtrability of the solution can be somewhat improved by adding the carbon powders thereto, but has found that the purity of the thus prepared 2-mercaptobenzothiazole is not always satisfactory in view of its melting point. When a larger amount of the oxidizing agent is used to obtain 2-mercaptobenzothiazole having a high purity, the yield is reduced, as described above.

However, the present inventor has found that all of these disadvantages can be successfully eliminated when the oxidation reaction is carried out under aeration in the presence of carbon powders. When the oxidizing agent is used under aeration, oxidation of impurities in the solution is promoted, and the purity of the purified solution is increased. When the carbon powders are added to the solution before the oxidation reaction, or in the course of the oxidation reaction, or after the completion of the oxidation reaction, the oxidation products separated in the solution are coagulated on the carbon powders suspended in the solution, and the solution turns to a clear one. None of such phenomena is observed in the case of siliceous powders or other adsorbing powders. As the carbon powders, active carbon, carbon black, charcoal, animal charcoal or other carbon material can be used. When the carbon powders are made present in the solution, the tarry oxidation products can be removed together with the carbon powders, for example, only by sedimentation of the carbon powders through settling. Particularly when the carbon powders are suspended in the solution before the oxidation treatment, the separated oxidation products do not attach to the recation vessel, and the separation by filtration or centrifuge can be much easily carried out.

It is desirable to keep the pH of the solution to about 8.5 or more, preferably about 9 to 12, during the oxidation reaction. At a pH of about 8.5, 2-mercaptobenzothiazole is liable to precipitate together with the oxidation products, through depending upon other reaction conditions, and the yield of 2-mercaptobenzothiazole is liable to be lowered. At a pH of more than about 12, the oxidation products are dissolved in the solution, and the purity of 2-mercaptobenzothiazole seperated from the solution is liable to be lowered.

The oxidation treatment is carried out by heating the solution to about 30° C. or higher, preferably about 40° C. to 100° C. When the oxidation treatment is carried out under said heated condition, 2-mercaptobenzothiazole is more difficult to precipitate, and at the same time, oxidation of the impurities to insoluble tarry oxidation products is much more promoted. As a result, the impurities can be more easily and sufficiently separated from the 2-mercaptobenzothiazole. About 1 to 3 hours are sufficient as the treating time, and a clear, purified 2-mercaptobenzothiazole solution can be obtained by separating the oxidation products coagulated on the carbon powders from the reaction solution. When the thus obtained solution is further treated with the oxidizing agent, benzothiazyl disulfide can be obtained, but generally, 2-mercaptobenzothiazole is precipitated as crystals by neutralizing the solution with dilute sulfuric acid or the like. The thus obtained crystals have a melting point of 177° C. or higher, and thus can be called "high purity 2-mercapto-benzothiazole." The yield is almost quantitative.

While the present invention had been described in connection with one preferred embodiment, it is to be understood that this description is illustrative only and is not intended to limit the invention.

For simplicity, the following abbreviation will be employed.

MBT: 2-mercaptobenzothiazole

EXAMPLE 1

(a) 250.5 g. of crude MBT (purity: 80%), 40 g. of sodium hydroxide and 400 ml. of water were charged into a 5000 ml.-capacity beaker to form a solution thereof. The solution was stirred for 30 minutes while the solution temperature was being maintained at 90–100° C. Then, water was added to the solution to increase the volume of the solution to 2500 ml.

In this operation, crude MBT may be dissolved in a 10% by volume solution of caustic soda.

The pH of the solution was measured to be about 490 m.v. by means of a pH meter.

Then, 15 g. of commercially available active carbon was added to the solution, and air was passed through the solution at a rate of 3–5 liters per minute while maintaining the solution at about 70° C. An aqueous solution of hydrogen peroxide (2% by volume) acidified with sulfuric acid was added gradually to the solution over a period of about 1 hour (the amount added of the hydrogen peroxide solution was about 120 ml.). Thus, a tarry substance was separated (precipitated) in the solution in the state mingled with the active carbon. When the precipitation of the oxidized product was not observed any more, the liquid phase became transparent. The pH of the solution at the end of the reaction was measured to be about 250 m.v. a pH meter.

The resulting solution was allowed to stand still for about 15 minutes to sediment solids (the active carbon and oxidized product). The supernatant liquor constituting a major portion of the liquid phase was taken, and the remaining liquor was filtered, the filtration being accomplished with great ease. The filtrate was combined with the supernatant liquor. Thus, there was obtained about 2500 ml. of the purified solution.

The thus obtained solution was neutralized at 40° C. with dilute sulfuric acid and the precipitate was filtered off with use of a Büchner funnel, and it was washed with water until the presence of sulfuric radicals was not observed in the washing liquor (until turbidity was not caused to appear in the washing liquor by addition if 10% barium chloride). Water was removed from the so washed precipitate, and it was dried at 100° C. for 7 hours. Thus, there was obtained 198 g. of pure MBT melting at 177–179° C. in a yield of 99% based on the weight of MBT in the crude MBT.

(b) In this example, oxidation-purification reaction of crude MBT was carried out without using the aeration and carbon powders.

120 ml. of an aqueous hydrogen peroxide solution (2% by volume) acidified with sulfuric acid was slowly added over a period of about 1 hour to an aqueous sodium hydroxide solution containing crude MBT in a dissolved state prepared in Example 1(a), while keeping the solution at a temperature of 70° C. Tarry substances separated with the progress of the oxidation reaction was suspended in the solution, and the solution did not turn to a clear solution. The pH of the solution at the completion of the reaction was about 340 m.v. by a pH meter.

The filtration of the thus obtained solution was difficult to effect, and particularly when the liquid temperature was 60° C. or higher, the tarry substance was sticky and the filtration was more difficult to effect.

When the filtrate was neutralized with dilute sulfuric acid in the same manner as in Example 1(a), 185 g. of purified MBT was obtained. Melting point: 173°–176° C.; yield: 92%.

When the amount of the aqueous hydrogen peroxide solution used in this example was increased to 360 ml., the pH of the solution at the completion of the reaction was 280 m.v., but the appearance of the solution and the difficulty in filtrability of the solution were not improved.

When the filtrate was neutralized with dilute sulfuric acid, 175 g. of purified MBT was obtained. Melting point: 175°–179° C.; yield: 87%.

(c) In this example, the oxidation-purification reaction of crude MBT was carried out under aeration without using the carbon powders.

120 ml. of an aqueous hydrogen peroxide solution (2% by volume) acidified with sulfuric acid was slowly added over a period of about one hour to an aqueous sodium hydroxide solution containing crude MBT in a dissolved state prepared in Example 1(a), while keeping the aqueous solution at a temperature of 70° C. and passing air through the aqueous solution at a rate of 3 to 5 l./min. A little larger amount of tarry substances were separated with the progress of the oxidation reaction, and the solution turned to a translucent solution. The pH of the solution at the completion of the reaction was about 280 m.v. by a pH meter.

The filtration of the thus obtained solution was difficult to effect, and particularly when the liquid temperature was 60° C. or higher, the tarry substance was sticky and the filtration was more difficult to effect.

The filtrate was neutralized with dilute sulfuric acid in the same manner as in Example 1(a), and 193 g. of purified MBT was obtained. Melting point: 175°–178° C.; yield: 96%.

When the amount of the aqueous hydrogen peroxide solution used in this example was increased to 360 ml., a little large amount of tarry substances was separated with the progress of the oxidation reaction, and the solution turned to a translucent one. At the same time, benzothiazyl disulfide was precipitated in the solution. However, the difficulty in the filtrability of the solution was not improved.

When the filtrate was neutralized with dilute sulfuric acid, 173 g. of purified MBT was obtained. Melting point: 177°–179° C.; yield: 86%.

(d) In this example, the oxidation-purification of the crude MBT was carried out in the presence of the carbon powders without using the aeration.

15 g. of commercially available active carbon was added to the aqueous sodium hydroxide solution containing crude MBT in a dissolved state prepared in Example 1(a), and 120 ml. of an aqueous hydrogen peroxide solution (2% by volume) acidified with sulfuric acid was slowly added thereto over a period of about one hour, while keeping the solution at 70° C. Tarry substances separated with the progress of the oxidation reaction were suspended in the solution.

Filtration of the thus obtained solution was carried out more easily than in Examples 1(b) and (c).

The filtrate was neutralized with dilute sulfuric acid in the same manner as in Example 1(a), and 185 g. of purified MBT was obtained. Melting point: 173°–176° C.; yield: 92%.

EXAMPLE 2

A purified solution obtained by repeating the procedure of Example 1(a) was neutralized and oxidized at 40° C. with use of an aqueous solution of hydrogen peroxide acidified with sulfuric acid. The resulting precipitate was recovered by filtration to obtain 194 g. of benzothiazyl disulfide melting at 174°–179° C. in a yield of 97%.

EXAMPLE 3

The procedure of Example 1(a) was repeated except that 56 g. of potassium hydroxide was used instead of the sodium hydroxide and 140 ml. of a 2% aqueous solution of potassium chlorate acidified with sulfuric acid was used instead of the hydrogen peroxide solution. As carbon powders there was used 15 g. of carbon black. As a result, there was obtained about 2500 ml. of a transparent, purified solution.

EXAMPLE 4

The procedure of Example 1(a) was repeated except that 100 ml. of 28% aqueous ammonia was used instead of the sodium hydroxide and 15 g. of carbon black was used as the carbon powders. As a result, there was obtained about 2500 ml. of a transparent, purified solution.

EXAMPLE 5

The procedure of Example 1(a) was repeated except that 150 ml ml. of a 2% aqueous solution of sodium hypochlorate acidified with sulfuric acid was used instead of the hydrogen peroxide solution and 15 g. of charcoal powders was used as the carbon powders. From the resulting purified solution there was obtained MBT in a yield of 95%.

EXAMPLE 6

The procedure of Example 1(a) was repeated except that 110 g. of calcium hydroxide was used instead of the sodium hydroxide and a 2% aqueous solution of sodium chlorate acidified with sulfuric acid was used as the oxiding agent. As a result, there was obtained about 2500 ml. of a transparent solution.

EXAMPLE 7

The procedure of Example 1(a) was repeated except that 98 ml. of a 2% aqueous solution of ammonium perchlorate acidified with sulfuric acid was used instead of the hydrogen peroxide solution. As a result, there was obtained about 2500 ml. of transparent, purified solution.

EXAMPLE 8

The procedure of Example 1(a) was repeated except that a chlorine gas diluted about 300 times with air was used as the oxidizing agent and this gaseous mixture of chlorine and air was introduced into the solution for 1 hour at a rate of 4 liters per minute, following which the reaction was terminated. When solids of the carbon powders and oxidized product were separated from the liquid phase, there was obtained about 2500 ml. of a transparent solution.

What is claimed is:

1. The process which comprises:
   (a) dissolving crude 2-mercaptobenzothiazole in an aqueous sodium hydroxide solution,
   (b) adding active carbon to the solution resulting from (a),
   (c) passing air through the solution while maintaining the solution at about 70° C.,
   (d) concurrently with Step (c) reacting the solution resulting from Steps (a)–(c) with an aqueous solution of hydrogen peroxide acidified with sulfuric acid,
   (e) separating a tarry substance mingled with the active carbon,
   (f) recovering a transparent liquid phase containing the sodium salt of 2-mercaptobenzothiazole.

2. The process according to claim 1 wherein the sodium salt of Step (f) is neutralized with dilute sulfuric acid, filtered, washed and 2-mercaptobenzothiazole of 99% purity recovered.

3. The process which comprises:
   (a) dissolving impure 2-mercaptobenzothiazole in an aqueous alkaline medium,
   (b) reacting the solution resulting from Step (a) with an oxidizing agent selected from the group consisting of hydrogen peroxide, sodium chlorate, potassium chlorate, ammonium perchlorate and chlorine,
   (c) aerating the solution during the reaction set forth in Step (b) and maintaining the reaction solution at a temperature between 40° C. and 100° C.,
   (d) during the course of Step (c) introducing into the reaction solution active carbon powder,
   (e) separating the solid material from the liquid material at the conclusion of the reaction, and
   (f) recovering a solution of alkaline 2-mercaptobenzothiazole.

4. The process which comprises:
   (a) dissolving crude 2-mercaptobenzothiazole in an aqueous alkaline solution,
   (b) reacting the solution resulting from Step (a) with an oxidizing agent,
   (c) aerating the solution during the reaction set forth in Step (b) and maintaining the temperature about 30° C.,
   (d) during the course of Step (c) introducing into the reaction solution active carbon powder,
   (e) separating the solid material from the liquid material at the conclusion of the reaction, and
   (f) recovering a solution of alkaline 2-mercaptobenzothiazole.

5. A process as claimed in claim 4, wherein the aqueous alkali is an aqueous solution of alkali metal hydroxide or ammonium hydroxide.

6. A process as claimed in claim 4 wherein the aeration is carried out by the use of air or oxygen-containing gas.

7. A process as claimed in claim 4, wherein the oxidation reaction is carried out at a temperature of from 40° C. to 100° C.

8. A process as claimed in claim 4 wherein the oxidation reaction is carried out at a pH of from 9 to 12.

9. A process as claimed in claim 4 wherein the oxidizing agent is selected from the group consisting of hydrogen peroxide, an alkali metal chlorate, an alkali metal hypochlorite or ammonium perchlorate.

10. A process as claimed in claim 4 wherein the oxidizing agent is chlorine gas diluted with air.

References Cited

UNITED STATES PATENTS

| | | | |
|---|---|---|---|
| 3,131,196 | 4/1964 | Wood | 260—306 |
| 2,730,528 | 1/1956 | Weyker et al. | |

OTHER REFERENCES

Weissberger, Technique of Organic Chemistry, vol. III, part I, pp. 707, 746–7 (1956).

RICHARD J. GALLAGHER, Primary Examiner